United States Patent
Yang et al.

(10) Patent No.: US 9,287,927 B2
(45) Date of Patent: Mar. 15, 2016

(54) CABLE ASSEMBLY AND SIGNAL TRANSMISSION SYSTEM USING THE SAME

(71) Applicants: INFINET TECHNOLOGY LTD., New Taipei (TW); BO-JIANG TECHNOLOGY CO., LTD., Tainan (TW)

(72) Inventors: Yao-Chou Yang, New Taipei (TW); Chi-Neng Huang, Tainan (TW); Chien-Yu Lin, New Taipei (TW); Chang-Hui Chiang, Tainan (TW); Jin-Kang Lin, New Taipei (TW); Pi-Chien Yeh, Kaohsiung (TW)

(73) Assignees: INFINET TECHNOLOGY LTD., New Taipei (TW); BO-JIANG TECHNOLOGY CO., LTD., Tainan (TW)

( * ) Notice: Subject to any disclaimer, the term of this patent is extended or adjusted under 35 U.S.C. 154(b) by 228 days.

(21) Appl. No.: 14/063,011

(22) Filed: Oct. 25, 2013

(65) Prior Publication Data
US 2015/0008034 A1 Jan. 8, 2015

(30) Foreign Application Priority Data
Jul. 3, 2013 (TW) .............................. 102212509 U (51) Int. Cl.
*H01R 9/05* (2006.01)
*H04B 3/04* (2006.01)
*H01R 24/44* (2011.01)
*H01P 3/02* (2006.01)

(52) U.S. Cl.
CPC .. *H04B 3/04* (2013.01); *H01P 3/02* (2013.01); *H01R 24/44* (2013.01)

(58) Field of Classification Search
CPC ........................................................ H01R 24/44
USPC ................................................. 439/578, 606
See application file for complete search history.

(56) References Cited

U.S. PATENT DOCUMENTS

| | | | | |
|---|---|---|---|---|
| 4,270,832 | A * | 6/1981 | Tanabe .......................... | 439/578 |
| 4,441,781 | A * | 4/1984 | Forney et al. ................. | 439/502 |
| 4,772,223 | A * | 9/1988 | Yasumoto ...................... | 439/578 |
| 4,824,399 | A * | 4/1989 | Bogar et al. ................... | 439/578 |
| 5,746,623 | A * | 5/1998 | Fuchs et al. .................... | 439/578 |
| 6,575,785 | B2 * | 6/2003 | Bohmer et al. ............... | 439/578 |
| 7,883,363 | B2 * | 2/2011 | Montena ....................... | 439/578 |

FOREIGN PATENT DOCUMENTS

| | | |
|---|---|---|
| KR | 1020030037493 | 5/2003 |
| KR | 1020100079358 | 7/2010 |

* cited by examiner

*Primary Examiner* — Tho D Ta
(74) *Attorney, Agent, or Firm* — Li & Cai Intellectual Property (USA) Office (57) ABSTRACT

An exemplary embodiment of the present disclosure illustrates a cable assembly. The cable assembly comprises a first cable and a second cable. The first cable has two contacts at both ends thereof, and the second cable has two contacts at both ends thereof. The first cable and second cable are used for transmitting a first signal and a second signal respectively. A differential signal is formed by the first signal and the second signal, and at least one of those contacts is an adjustable contact. The adjustable contact adjusts an electrical length of the first cable or the second cable to control a phase error between the first signal and the second signal.

18 Claims, 7 Drawing Sheets

CABLE ASSEMBLY AND SIGNAL TRANSMISSION SYSTEM USING THE SAME

BACKGROUND

1. Technical Field

The present disclosure relates to a cable assembly, in particular, to an adjustable matched cable assembly and a signal transmission system thereof.

2. Description of Related Art

In the environment which the information transmission develops rapidly, the communication technology is improved day by day accompanying with the requirements of users. However, it needs high transmission quality for the radio frequency (RF) or microwave signal transmission.

In general, since the microwave system almost uses the differential signal for transmission, the two cables for signal transmission need high accuracy of phase matching. In other words, the phase error between two signals transmitted by the two cables must be within the range. Therefore, each cable in the cable assembly must have a specific electrical length according to the manufacture specification. In the application of the cable assembly requiring phase matching, the ideal situation is that the each cable in the cable assembly has the same or similar electrical length to each other.

Figure 1:
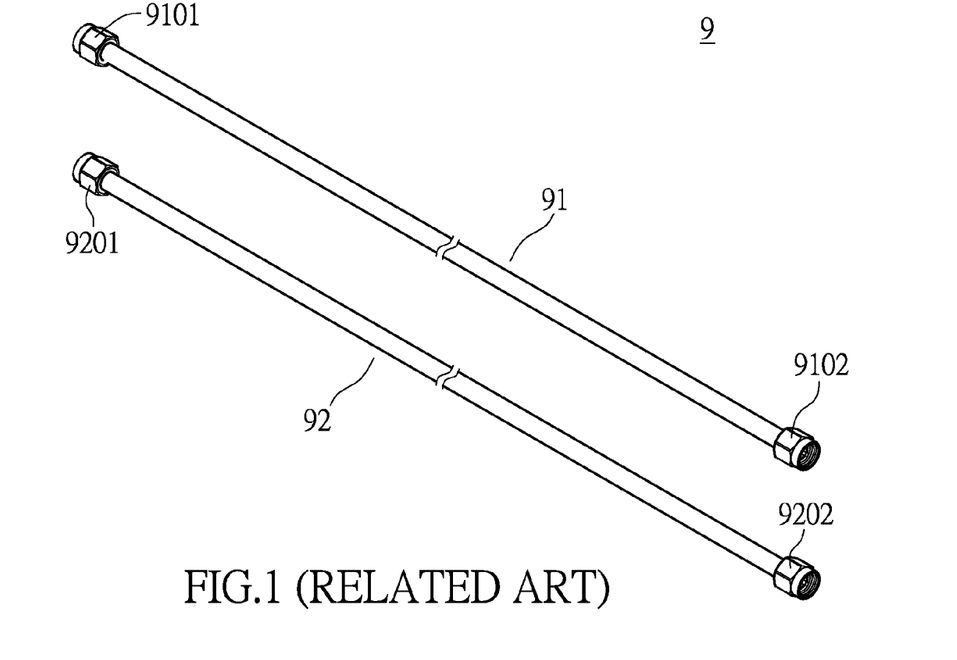
FIG. 1 is a stereoscopic diagram of a traditional cable assembly.

Please refer to FIG. 1. FIG. 1 is a stereoscopic diagram of the traditional cable assembly. The traditional cable assembly 9 comprises a first cable 91 and a second cable 92. The first cable 91 has two fixed (or immovable) contacts 9101, 9102 at both ends thereof, and the second cable 92 has two fixed contacts 9201, 9202 at both ends thereof in the similar manner. Since the first cable 91 and a second cable 92 shall have the equal or approximate electrical lengths to each other, the signals respectively transmitted by the first cable 91 and the second cable 92 have the small phase error between each other, and the correct differential signal is therefore formed by the signals respectively transmitted by the first cable 91 and the second cable 92.

Although the electrical length relates with the physic length in the practical application, the electrical length error of the between the cables having the same physic length still exists. Therefore, during the process for manufacturing the cable assembly, a large number of cables with the approximate physic lengths are firstly manufactured. Then, during the process for selecting the cables, two cables of the cables are selected to be tested repeatedly, and two cables which have the electrical length error therebetween within the specific range are selected out as the cable assembly according to the test results. By using the abovementioned method, the cost for manufacturing numerous cables is increasing while the microwave (or RF) device (or system) may require the cables with the long physic length. In a word, the conventional method for manufacturing the matched cable assembly consumes the massive cost and the time of selection and testing.

SUMMARY

An exemplary embodiment of the present disclosure provides a cable assembly. The cable assembly comprises a first cable and a second cable. The first cable has two contacts at both ends thereof, and the second cable has two contacts at both ends thereof. The first cable and second cable are used for transmitting a first signal and a second signal respectively. A differential signal is formed by the first signal and the second signal, and at least one of those contacts is an adjustable contact. The adjustable contact adjusts an electrical length of the first cable or the second cable to control a phase error between the first signal and the second signal by adjusting.

An exemplary embodiment of the present disclosure provides a signal transmission system. The signal transmission system comprises a first cable, a second cable, and a signal transmission system body. The first cable has two contacts at both ends thereof, and the second cable has two contacts at both ends thereof. The first cable and second cable are used for transmitting a first signal and a second signal respectively. The signal transmission system body is used for outputting or receiving the first signal and the second signal. A differential signal is formed by the first signal and the second signal, and at least one of those contacts is an adjustable contact. The adjustable contact adjusts an electrical length of the first cable or the second cable to control a phase error between the first signal and the second signal.

To sum up, the manufacturing company may adjust the electrical length deviation between the first cable and the second cable by adjusting the adjustable contact of the first cable or second cable. Not liked the conventional manner which has to manufacture numerous cables with the approximate physic length firstly, and then among the cables, select two cables which have the electrical length error therebetween within the specific range from those cables by the phase error in the range between the two cables as the cable assembly, the matched cable assembly in present disclosure may reduce the cost, time, and labor power in original manufacturing process.

In order to further the understanding regarding the present disclosure, the following embodiments are provided along with illustrations to facilitate the disclosure of the present disclosure.

DETAILED DESCRIPTION OF THE EXEMPLARY EMBODIMENTS

The aforementioned illustrations and following detailed descriptions are exemplary for the purpose of further explaining the scope of the present disclosure. Other objectives and advantages related to the present disclosure will be illustrated in the subsequent descriptions and appended drawings, but not intended to limit the present disclosure.

Figure 2:
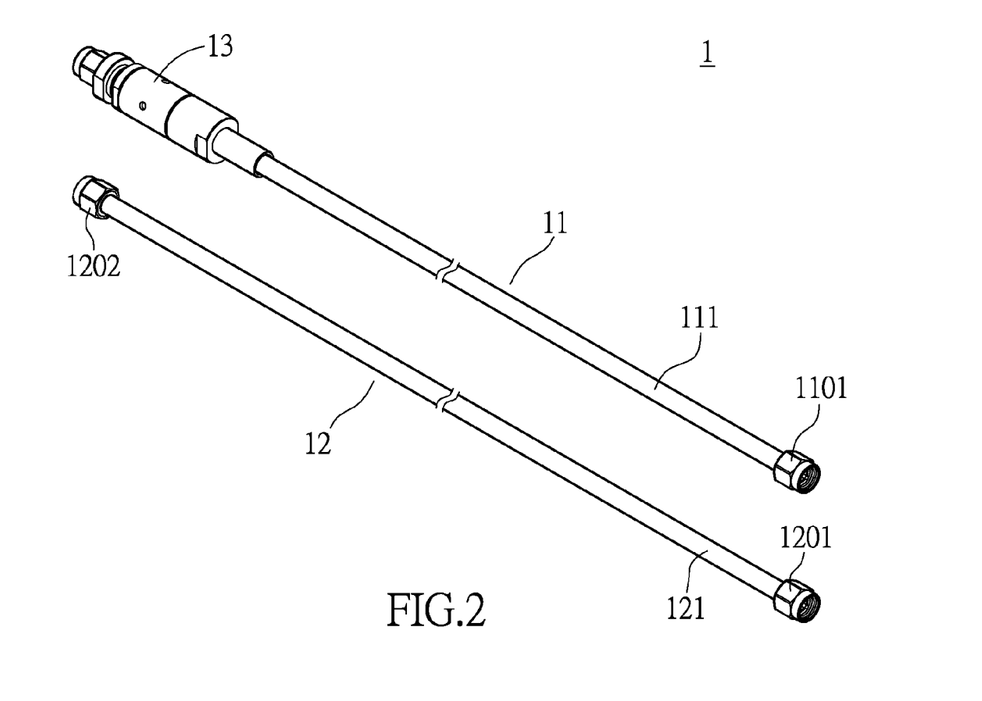
FIG. 2 is a stereoscopic diagram of an adjustable matched cable assembly according to an exemplary embodiment of the present disclosure.

Please refer to FIG. 2. FIG. 2 is a stereoscopic diagram of an adjustable matched cable assembly according to an exemplary embodiment of the present disclosure. The present disclosure provides an adjustable matched cable assembly 1. The adjustable matched cable assembly 1 comprises a first cable 11, a second cable 12. The first cable 11 has an adjustable contact 13 and a fixed contact 1101 respectively at both ends thereof, and the second cable 12 has two fixed contacts 1201, 1202 respectively at both ends thereof.

The first cable 11 and the second cable 12 have central conductive lines and wrapping layers 111, 121 respectively. The central conductive lines of first cable 11 and the second cable 12 are made of the copper, iron, gold and silver or other conductive metals. In the exemplary embodiment of the present disclosure, the wrapping layers 111, 121 may be the heat-shrink tube, and the heat-shrink tube can be made of Polyethylene (PE). The wrapping layers 111, 121, for example, can be the rubber, silicone rubber or other insulating material, however, the present disclosure is not limited thereto. One end of central conductive line of the first cable 11 couples to the fixed contact 1101, and another end couples to the adjustable contact 13. Both ends of central conductive line of the first cable 12 couples to the fixed contact 1201, 1202 respectively.

The first cable 11 and the second cable 12 are used for transmitting a first signal and a second signal respectively, wherein the first signal and the second signal form a differential signal. In the case that the first signal and the second signal have high frequencies, the phase error between the first and second signals shall be within in a very small range for insuring the accuracy of the differential signal. Therefore, the electrical lengths of the first cable 11 and the second cable 12 need to be same or similar with each other. The adjustable contact 13 can adjust the electrical length of the first cable 11 to let the electrical length of the first cable 11 is same or similar to the electrical length of the second cable 12.

Figure 3:
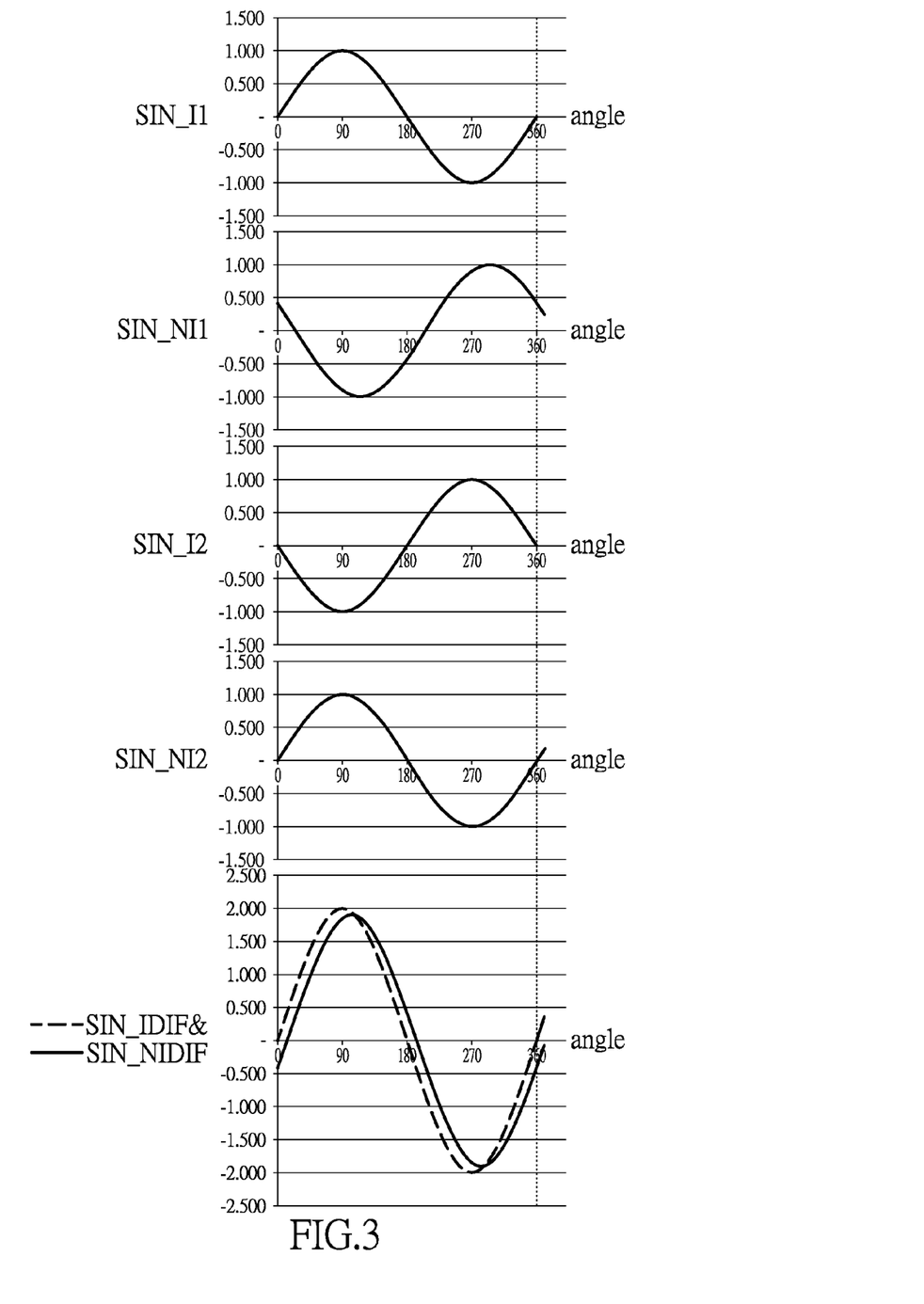
FIG. 3 is a waveform diagram of a differential signal diagram transmitted by a first cable and a second cable of an adjustable matched cable assembly according to an exemplary embodiment of the present disclosure.

Then, please refer to FIG. 2 and FIG. 3 simultaneously. FIG. 3 is a waveform diagram of a differential signal diagram transmitted by a first cable and a second cable of an adjustable matched cable assembly according to an exemplary embodiment of the present disclosure. The first ideal signal SIN_I1 is the ideal signal transmitted by the first cable 11. The second ideal signal SIN_I2 is the ideal signal transmitted by the second cable 12. The ideal differential signal SIN_IDIF is formed by the first ideal signal SIN_I1 and the second ideal signal SIN_I2. The first non-ideal signal SIN_NI1 is the non-ideal signal transmitted by the first cable 11. The second ideal signal SIN_NI2 is the non-ideal signal transmitted by the second cable 12. The non-ideal differential signal SIN_NIDIF is formed by the first non-ideal signal SIN_NI1 and the second non-ideal signal SIN_NI2.

As the related art said above, although the physic lengths of the two cables of the conventional cable assembly are same, the electrical lengths of the cables actually still are not identical. However, if the electrical length of the first cable 11 is different from the electrical length of the second cable 12, the arriving time that the first non-ideal signal transfers from the end to another end in the first cable 11 is different to the arriving time that the second non-ideal signal transfers from the end to another end in the second cable 12, and thus the generated the differential signal is incorrect (i.e. the phase error between the ideal differential signal SIN_IDIF and the non-ideal differential signal SIN_NIDIF exists). Therefore, in the exemplary embodiment of the present disclosure, the adjustable contact 13 can adjust the electrical length of the first cable 11 to let the electrical length of the first cable 11 is same or similar to the electrical length of the second cable 12. The phase error between the first signal and the second signal may be under controlled within the specific range, and the generated differential signal is correct (such as the ideal differential signal SIN_IDIF).

It's worth noting that, the present disclosure doesn't limit the amount of the adjustable contact 13, and further doesn't limit that the adjustable contact 13 just only is situated in the first cable 11. In another exemplary embodiment, the adjustable contact 13 also may be situated in the second cable 12. In other word, the adjustable contact 13 can be situated at least one of ends in the first cable 11 or the second cable 12. Herein, though the situation that the adjustable contact 13 is situated in the first cable 11 is illustrated, the present disclosure is not limited thereto. Moreover, the first cable 11 and the second cable 12 are the 65 GHz precision cable, 50 GHz precision cable, 40 GHz precision cable, 26 GHz precision cable, 20 GHz precision cable, high-frequency low-loss phase stable precision cable, armored sheathed cable, or high power cable. In short, the type of the first cable 11 and the second cable 12 is not used to limit the present disclosure.

Figure 4A:
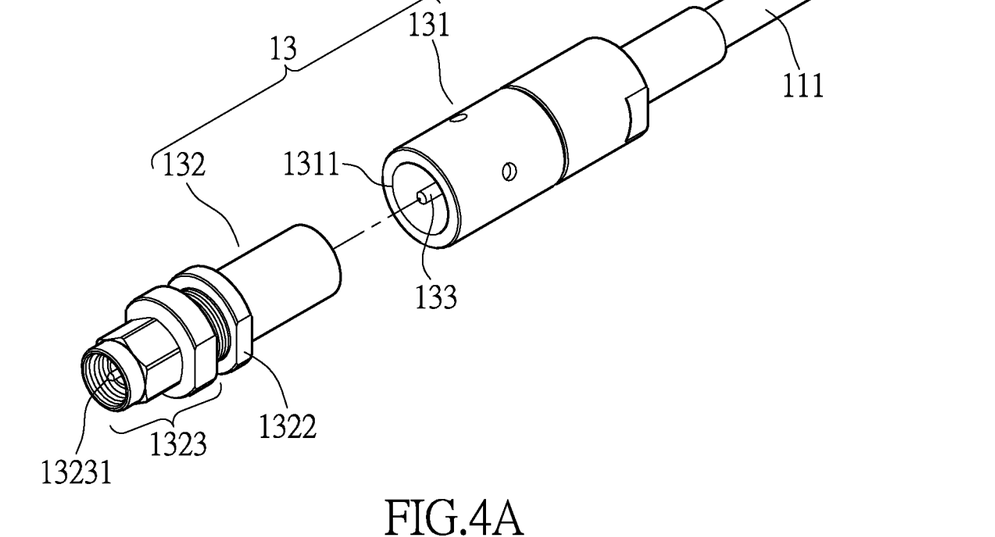
FIG. 4A and FIG. 4B are stereoscopic diagrams of an adjustable contact of an adjustable matched cable assembly in the different observation angles according to an exemplary embodiment of the present disclosure.
Figure 4B:
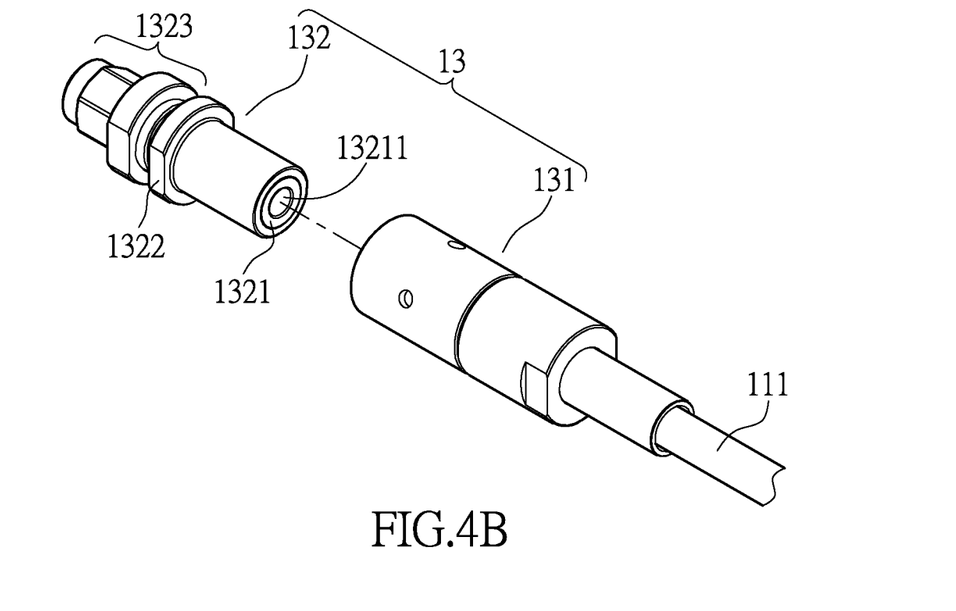

Please refer to FIG. 4A and FIG. 4B simultaneously. FIG. 4A and FIG. 4B are stereoscopic diagrams of an adjustable contact of an adjustable matched cable assembly in the different observation angles according to an exemplary embodiment of the present disclosure. FIG. 4A and FIG. 4B show the details of the adjustable contact 13 of FIG. 2. The adjustable contact 13 includes a seating 131, an axial conductor 133, and an adjusting portion 132. The seating 131 is the hollow prism. The seating 131 has an opening in one side of the seating 131 and a space 1311 corresponds to the opening in the seating 131. The axial conductor 133 is situated at axial portion of the seating 131 and runs through the bottom of the seating 131. The axial conductor 133 couples to the central conductive line of the first cable 13.

The interior of the adjusting portion 132 includes an adjusting unit 1321, a ring 1322, and a signal transmission port 1323. The space 1311 of the seating 131 is used to accommodate the part of the adjusting portion 132. The outer wall of adjusting portion 1321 contacts the space 1311 and dovetails with the seating 131.

The adjusting unit 1321 is situated at the end of the adjusting portion 132, and can be accommodated in the space 1311 of the seating 131 correspondingly. The adjusting unit 1321 is made of conductive material and includes an adjusting space 13211. The adjusting space 13211 is used for accommodating at least part of the axial conductor 133. The axial conductor 133 contacts the inner wall of the adjusting unit 1321. The electrical length of the first cable 11 may be adjusted according to the contacting position between the axial conductor 133 and the adjusting unit 1321. In other word, the adjusting portion 132 contacts the axial conductor 133 through the adjusting space 13211 of the adjusting unit 1321, and couples to the central conductive line of the first cable 11. The adjusting unit 1321 may be made of the copper, gold, or iron. The signal transmission port 1323 is situated at another end of the adjusting portion 132, for connecting to the radio frequency, microwave device, or the connecting port of the system. The signal transmission port 1323 includes a signal transmission pin 13231, and the signal transmission pin 13231 couples to the adjusting unit 1321.

Figure 5:
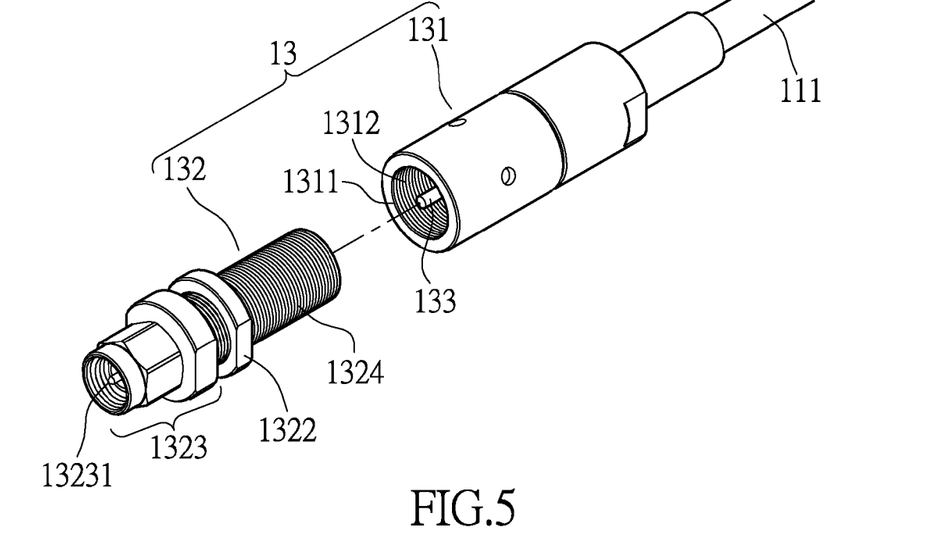
FIG. 5 is a stereoscopic diagram of an adjustable contact of an adjustable matched cable assembly according to another exemplary embodiment of the present disclosure.

Please refer to FIG. 5. FIG. 5 is a stereoscopic diagram of an adjustable contact of an adjustable matched cable assembly according to another exemplary embodiment of the present disclosure. The difference between the exemplary embodiment of FIG. 4A and FIG. 4B and the exemplary embodiment of FIG. 5 is that the inner wall of space 1311 has a screw 1312. The space 1311 is formed as a hollow prism by hollowing out from one end of the seating 131. The part of the adjusting portion 132 can be accommodated in the space 1311 of the seating 131. The part of the adjusting portion 132 has a screw 1324 at outer wall of the part of the adjusting portion 132. The screw 1324 is corresponding to the screw 1312. Through the screw 1324, the adjusting portion is able to screw into the space 1311 and to dovetail with the seating 131.

The present disclosure also may situate the rectilinear grain on the inner wall of the space 1311 and the outer wall of the adjusting portion 132, for fixing the seating 131 and the adjusting portion 132. However, the present disclosure is not limited thereto.

Figure 6:
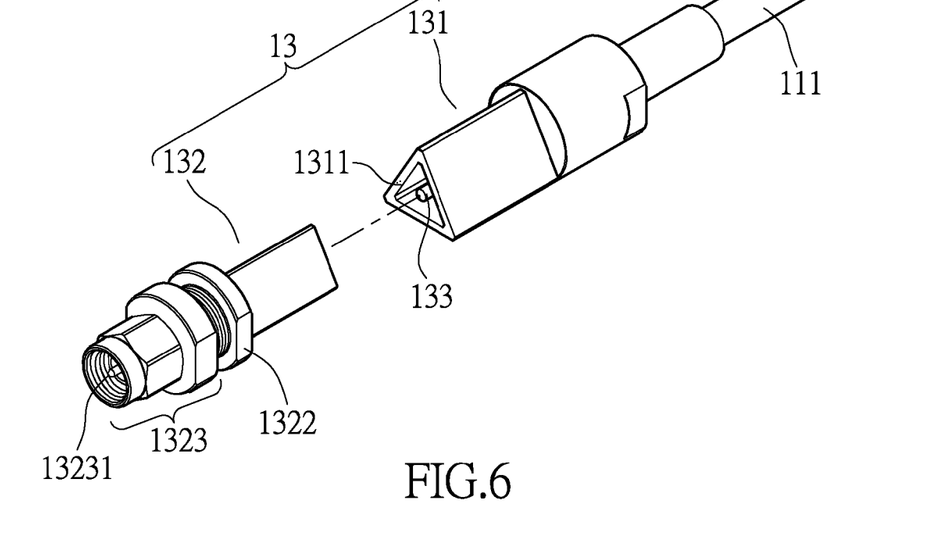
FIG. 6 is a stereoscopic diagram of an adjustable contact of an adjustable matched cable assembly according to another exemplary embodiment of the present disclosure.

Please refer to FIG. 6. FIG. 6 is a stereoscopic diagram of an adjustable contact of an adjustable matched cable assembly according to another exemplary embodiment of the present disclosure. The difference between the exemplary embodiment of FIG. 4A and FIG. 4B and the exemplary embodiment of FIG. 6 is that the seating 131 in FIG. 6 is a triangular prism. The space 1311 is formed as a hollow triangular prism by hollowing out from one end of the seating 131. The part of the adjusting portion 132 which is accommodated in the space 1311 of the seating 131 is also as a triangular prism. The part of the adjusting portion 132 is accommodated the space 1311 and dovetailed with the seating 131 which is formed as hollow triangular prism.

It is worth mentioning that the space 1311 also may be formed as a hollow quadrangular prism, pentagon prism or polygonal prism, for fixing the seating 131 and the adjusting portion 132. However, the present disclosure is not limited thereto.

Figure 7A:
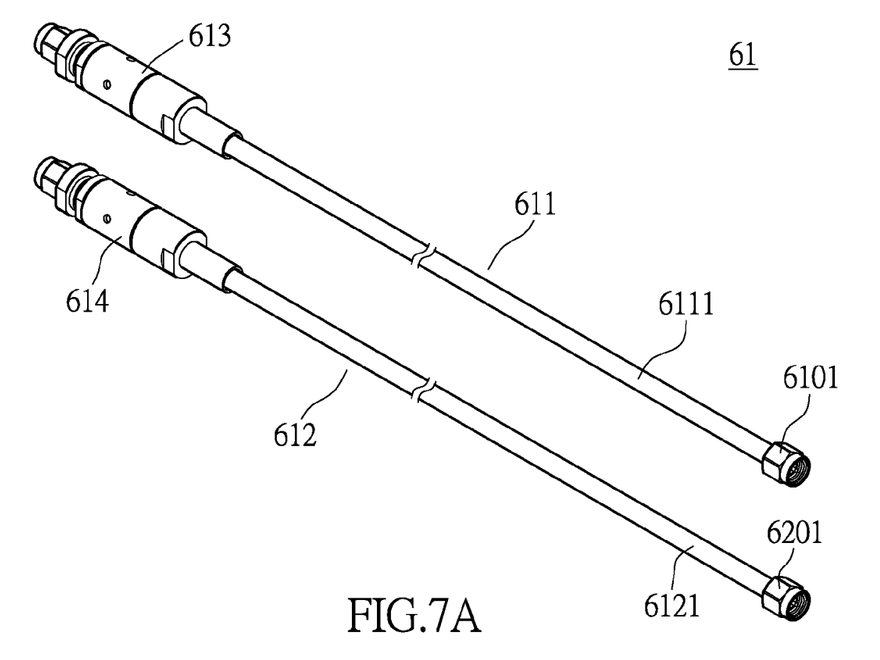
FIG. 7A is a stereoscopic diagram of an adjustable matched cable assembly according to another exemplary embodiment of the present disclosure.

Please refer to FIG. 7A. FIG. 7A is a stereoscopic diagram of an adjustable matched cable assembly according to another exemplary embodiment of the present disclosure. The adjusting matched cable assembly 61 includes a first cable 611 and a second cable 612. The first cable 611 has an adjustable contact 613 in one end thereof and a fixed contact 6101 in another end thereof. The second cable 612 also has an adjustable contact 614 in one end thereof and a fixed contact 6201 in another end thereof.

The difference between the exemplary embodiment of FIG.7A and the exemplary embodiment of FIG. 2 is that the first cable 611 and the second cable 612 have the adjustable contact 613 and the 614 respectively at the same time. Therefore, the present disclosure may also be applied to the multiple cables of the adjusting matched cable assembly in the radio frequency or microwave system. Each cable (the first cable 611 and the second cable 612) also can adjust themselves electrical lengths by the adjustable contact 613 and 614. For example, the microwave system may have a requirement in the special microwave system. The requirement is that the time difference between the time that the first signal arrives the end from another end of the first cable and the time that the second signal arrives the end from another end of the second cable must be limited in 10ps. Adjusting the electrical lengths of first cable 611 and the second cable 612 through the adjustable contacts 613 and 614 can be used to achieve the above requirement.

Figure 7B:
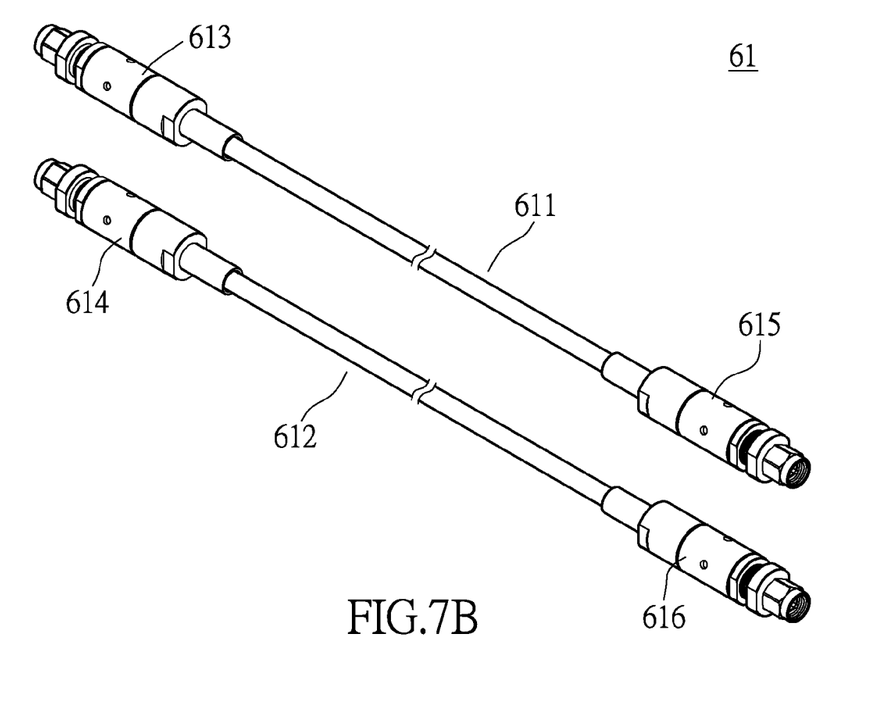
FIG. 7B is a stereoscopic diagram of an adjustable matched cable assembly according to another exemplary embodiment of the present disclosure.

Please refer to FIG. 7B. FIG. 7B is a stereoscopic diagram of an adjustable matched cable assembly according to another exemplary embodiment of the present disclosure. An adjusting matched cable assembly 61 includes a first cable 611 and a second cable 612. The first cable 611 has adjustable contacts 613 and 615 at both ends thereof, and the second cable 612 has adjustable contacts 614 and 616 at both ends thereof.

The difference between the exemplary embodiment of FIG. 7B and the exemplary embodiment of FIG. 2 is that the first cable 611 and the second cable 612 in FIG. 7B have the adjustable contact 613, 615 and adjusting 614, 616 simultaneously. In the microwave system, the position which the system device is installed is not easy to adjust at any time. Therefore, the user may adjust the one end of the first cable 611 or the second cable 612 which operates easily according to the variation requirement for the radio frequency or microwave system. Or alternatively, the user can adjust the one end of the cable which is more close to user. It worth mentioning, not like the traditional cable assembly which the user has to remove or replace all cable assembly, the cable assembly in the exemplary embodiment adds convenience for using, since the adjusting can be achieved by adjusting the adjustable contacts 613, 615 and the adjustable contacts 614, 616.

Figure 8:
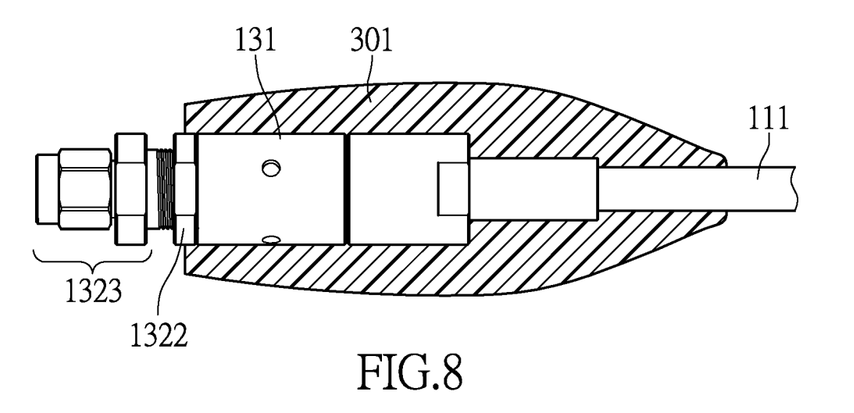
FIG. 8 is a sectional diagram of a fixed bushing of an adjustable matched cable assembly according to an exemplary embodiment of the present disclosure.

Please refer to FIG. 8. FIG. 8 is a sectional diagram of a fixed bushing of an adjustable matched cable assembly according to an exemplary embodiment of the present disclosure. If it doesn't need change the electrical length of a first cable 111 again after completing the adjustment of the electrical length of the first cable 111, a fixed bushing 301 can be used to seal the adjustable contact 13. In FIG. 8, a ring 1322 is situated between the adjusting unit 1321 and signal transmission port 1323. The ring 1322 is used for fixing the contacting portion between the adjusting portion 132 and the seating 131. The fixed bushing 301 may be implemented by the assembling or gluing manner. The fixed bushing 301 may be made of the rubber, silicone rubber, or other insulating material. Moreover, after the adjustable contact in another embodiment abovementioned adjusts the electrical length for corresponding cable, the adjustable contact can be sealed by the method abovementioned.

Figure 9:
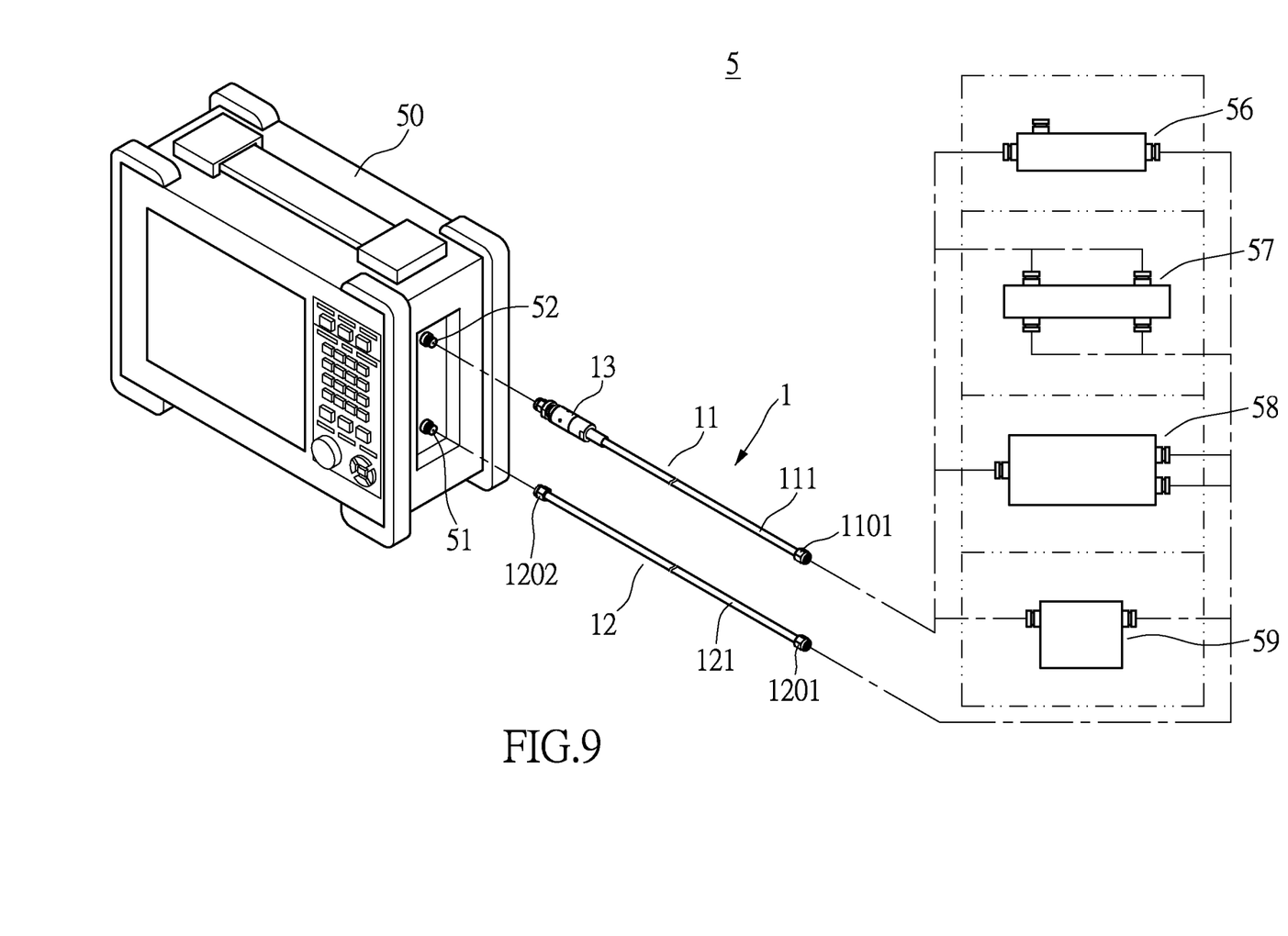
FIG. 9 is schematic diagram of a signal transmission system using an adjustable matched cable assembly according to an exemplary embodiment of the present disclosure.

Please refer to FIG. 9. FIG. 9 is schematic diagram of a signal transmission system using an adjustable matched cable assembly according to an exemplary embodiment of the present disclosure. A signal transmission system 5 includes an adjusting cable assembly 1 and a signal transmission system body 50. The adjusting cable assembly 1 connects to the signal transmission system body 50, wherein the fixed contacts 1101, 1201 are connected to tows of connectors 56-59 respectively, and the fixed contact 1202 and the adjustable contact 13 are connected to the connecting unit 51, 52 of the signal transmission system body 50. The adjusting cable assembly 1 may be the adjusting cable assembly in the each embodiment of the present disclosure or the adjusting matched cable assembly which is taught and reformed based on the present disclosure. The signal transmission system body 50 outputs or receives a first signal and a second signal. The first signal and the second signal are transferred to connector 56-59 through the first cable 11 and the second cable 12 of the adjusting matched cable assembly respectively. The signal transmission system 5 may be the phase array radar system, ECM system, microwave height measuring system, base station communication system, cable television (CATV), master antenna television (MATV), or radio monitor. The connector 56-59 abovementioned may be the coaxial coupler or coaxial splitter.

In the signal transmission system 5, the first cable 11 and the second cable 12 need equivalent electrical length (though the drawings just shows the two ideal cables, the present disclosure is not limited thereto). The condition is usually that the phase-matching accuracy is limited within 2 ps of the time difference between the arriving time of the first signal and the second signal. Therefore, the matched condition of the signal transmission system 5 is satisfied through adjusting the electrical length deviation of the first signal and the second signal which are transferred by the first cable 11 and the second cable 12 respectively in the cable assembly.

In summary, according to the exemplary embodiments in the present disclosure, the electrical length of each cable in the adjusting matched cable assembly may be adjusted by the adjustable contact directly. Not liked the conventional manner which has to manufacture numerous cables with the approximate physic length firstly, and then among the cables, select two cables which have the electrical length error therebetween within the specific range from those cables by the phase error in the range between the two cables as the cable assembly, the matched cable assembly in present disclosure may reduce the cost, time, and labor power in original manufacturing process.

On the other hand, the user also may adjust the electrical length of the cables according to the phase requirement of special radio frequency, microwave system by the adjustable contact at any time. The user adjusts the adjustable contact lets the signal in the cable of the cable assembly has the certain phase difference. It is worth that according to the adjusting matched cable assemblies of the present disclosure, the users may operate the radio frequency, microwave system flexibly and providing the stability, accuracy and handling when the system is operating.

The descriptions illustrated supra set forth simply the preferred embodiments of the present disclosure; however, the characteristics of the present disclosure are by no means restricted thereto. All changes, alternations, or modifications conveniently considered by those skilled in the art are deemed to be encompassed within the scope of the present disclosure delineated by the following claims.

What is claimed is:

1. A cable assembly, comprising:
    a first cable, having two contacts at both ends thereof, for transmitting a first signal; and
    a second cable, having two contacts at both ends thereof, for transmitting a second signal;
    wherein a differential signal is formed by the first signal and the second signal, and at least one of those contacts is an adjustable contact, the adjustable contact adjusts an electrical length of the first cable or the second cable to control a phase error between the first signal and the second signal by adjusting;
    wherein the adjustable contact comprising:
    a seating, being a hollow prism, having an opening in one side of the seating and a space corresponds to the opening in the seating;
    an axial conductor, electrically connected to the first cable or second cable; and
    an adjusting portion, an outer wall of the adjusting portion contacts an inner wall of the seating, the adjusting portion has an adjusting unit, the adjusting unit accommodates at least part of the axial conductor, and the axial conductor contacts an inner wall of the adjusting unit.

2. The cable assembly according to claim 1, wherein the electrical length is adjusted according to a contacting position between the axial conductor and the adjusting unit.

3. The cable assembly according to claim 1, wherein the space of the seating is a triangular prism, quadrangular prism, or other polygonal prism.

4. The cable assembly according to claim 1, wherein the first cable and the second cable have a central conductive line.

5. The cable assembly according to claim 1, further comprising:
    a third cable, having two contacts at both ends thereof, for transmitting a third signal.

6. The cable assembly according to claim 1, wherein the space of the seating has a first screw.

7. The cable assembly according to claim 6, wherein the outer wall of the adjusting portion has a second screw, the second screw corresponds to the first screw, such that the adjusting portion is able to screw into the space of the seating.

8. The cable assembly according to claim 1, wherein the adjustable contact further comprises at least one of fixed bushings, the fixed bushing is situated at a contacting point between the seating and the adjusting portion, and the fixed bushing is used for fixing a contacting position between the axial conductor and the adjusting unit.

9. The cable assembly according to claim 8, wherein the fixed bushing is made of rubber or plastic.

10. A signal transmission system, comprising:
    a first cable, having two contacts at both ends, for transmitting a first signal;
    a second cable, having two contacts at both ends, for transmitting a second signal; and
    a signal transmission system body, for outputting or receiving the first signal and the second signal;
    wherein a differential signal is formed by the first signal and the second signal, and at least one of those contacts is an adjustable contact, the adjustable contact adjusts an electrical length of the first cable or the second cable to control a phase error between the first signal and the second signal;
    wherein the adjustable contact comprising;
    a seating, being hollow prism, having an opening in one side of the seating and a space corresponds to the opening in the seating;
    an axial conductor, electrically connected to the first cable or second cable; and
    an adjusting portion, an outer wall of the adjusting portion contacts an inner wall of the seating, the adjusting portion has an adjusting unit, the adjusting unit accommodates at least part of the axial conductor, and the axial conductor contacts an inner wall of the adjusting unit.

11. The signal transmission system according to claim 10, wherein the electrical length is adjusted according to a contacting position between the axial conductor and the adjusting unit.

12. The signal transmission system according to claim 10, wherein the space of the seating is a triangular prism, quadrangular prism.

13. The signal transmission system according to claim 10, wherein the first cable and the second cable have a central conductive line.

14. The signal transmission system according to claim 10, further comprising:
    a third cable, having two contacts at both ends thereof, for transmitting a third signal.

15. The signal transmission system according to claim 10, wherein the space of the seating has a first screw.

16. The signal transmission system according to claim 15, wherein the outer wall of the adjusting portion has a second screw, the second screw corresponds to the first screw, such that the adjusting portion is able to screw into the space of the seating.

17. The signal transmission system according to claim 10, wherein the adjustable contact further comprises at least one of fixed bushings, the fixed bushing is situated at the contacting point between the seating and the adjusting portion, and the fixed bushing is used for fixing a contacting position between the axial conductor and the adjusting unit.

18. The signal transmission system according to claim 17, wherein the fixed bushings are made by rubber or plastic.

\* \* \* \* \*